Patented June 17, 1952

2,600,689

UNITED STATES PATENT OFFICE 2,600,689

SILICA-EXTENDED TIN OXIDE AND METHOD OF PREPARING SAME

Hartmut W. Richter, Rahway, N. J., assignor to Metal & Thermit Corporation, New York, N. Y., a corporation of New Jersey No Drawing. Application May 28, 1947, Serial No. 751,148

11 Claims. (Cl. 106—312)

This invention relates to tin oxide-silica compositions and to methods for producing them and has for its object the provision of such compositions to replace the tin oxide of commerce, which is a relatively expensive material, in certain applications. The commercial oxide is extensively used, for example, in the ceramics industry as an opacifier and for preparing ceramic stains, and also in the stone polishing trade. In some cases, the present compositions are superior in performance over commercial tin oxide, so far as opacifying power is concerned, and in other cases they serve as satisfactory substitutes, but in either case they are less expensive. Other objects and advantages will become apparent as the description proceeds.

The compositions may comprise silica and tin oxide in variable proportions, although for any given application the amounts of each component may be restricted within more or less well-defined limits in order to secure the best results consistent with good tin oxide economy. According to the invention, compositions comprising about 60 to about 90% by weight of tin oxide and about 5 to about 30% by weight of silica produce results, as opacifiers, which are at least satisfactory.

The compositions are produced in solid form by heating an aqueous solution of sodium silicate together with a tin compound selected from the class consisting of sodium stannate and tin hydrate at a temperature in the range of about 150° C. to the critical temperature of water and at a pressure sufficient to maintain a liquid phase throughout the temperature range. Heating under pressure may be continued until no further solid is formed, at which time the heating may be discontinued, the pressure released and the solid composition recovered. Where, as is preferable, sodium stannate is heated with the sodium silicate, a precipitate comprising silica and stannic oxide is formed, and coincident therewith is the production or generation of caustic alkali in free, uncombined form. This alkali remains in the solution after separation of the precipitate and may be recovered or re-used as such, thus affording further economies.

Any generally suitable grade of sodium silicate may be used, including commercially available stocks. The sodium stannate is desirably in the form of an aqueous solution, which may vary widely in concentration from dilute solutions containing, say, 5% by weight or less of the stannate, to saturated solutions, and free alkali may or may not be initially present. The stannate solutions may or may not contain other constituents such as sodium carbonate, sodium chloride, sodium soaps, and the like.

The temperature of heating is generally in the range of about 150° C. to the critical temperature of water (approximately 374° C.). It has been found that the yield of tin oxide-silica precipitate tends to be greater at higher temperatures, and for this reason temperatures in excess of 150° C. are preferred. Particularly good results have been exhibited by the compositions obtained at 200 to 240° C. Water is invariably present in the material undergoing treatment, either as added water or formed water, or both, and conditions are so controlled as to maintain a liquid phase at all times during the heating. To this end the pressure is coordinated with the temperature to maintain liquid phase conditions. Thus at the initial temperature of 150° C. the pressure may be about 70 p. s. i., while at higher temperatures the pressure is higher, ranging to 1000–1500 p. s. i. and more. For a given temperature the pressure may be higher than that necessary to maintain a liquid phase. It has been found that for the solutions contemplated herein, the steam-water vapor pressure relationship substantially holds.

The time of heating is preferably such as to enable the maximum amount of tin oxide-silica to be formed. Broadly speaking, the time may vary from a few minutes to several hours, but in practice, equilibrium between the silicate and the tin compound on the one hand and the products resulting from them on the other hand may usually be attained in about a half hour.

In some cases it may be advisable to precipitate tin hydrate from the sodium stannate solution and then to subject the hydrate and sodium silicate together to the above described pressure heating, there being formed a solid composition comprising silica and stannic oxide. This technique is advantageous where the sodium stannate is impure, as most if not all of the impurities may be eliminated in the step of precipitating the tin hydrate. The latter precipitation may be carried out with a mineral acid or, preferably, with carbon dioxide or sodium bicarbonate.

The invention may be illustrated by the data in Table I, in which are tabulated the results of a number of experiments in each of which a solution containing sodium stannate and sodium silicate was heated under definite conditions of tin concentration, initial free alkali, temperature, pressure and time. The opacifying power of the precipitated tin oxide-silica composition obtained in each experiment was then visually compared with three commercial opacifiers, each consisting of tin oxide and designated as X, Y, and Z. For this comparison each composition and the three commercial materials were applied in the form of a glaze to tile blocks, as in the manufacture of sanitary ware, the glaze composition in each case being uniform outside of the selection of the opacifier. The glaze composition, in ters of weight percentages, is as follows:

| | |
|---|---|
| Na$_2$O | 0.97 |
| K$_2$O | 4.60 |
| CaO | 11.70 |
| ZnO | 8.10 |
| Al$_2$O$_3$ | 12.23 |
| SiO$_2$ | 58.50 |
| Opacifier | 3.90 |

The advantages of the invention may also be realized with glazes having a more general range of ingredients and weight percentages, such as those included within the following definition:

| | |
|---|---|
| Na$_2$O | 0–7 |
| K$_2$O | 0–7 |
| CaO | 0–14 |
| ZnO | 0–14 |
| PbO | 0–40 |
| B$_2$O$_3$ | 0–18 |
| Al$_2$O$_3$ | 0–15 |
| SiO$_2$ | 30–70 |
| Opacifier | 1–10 |

In the latter definition, at least one of the first five ingredients should be present in the glaze. It is also preferable that alumina be present.

The sodium silicate in the foregoing examples of Table I was a commercial material containing about 9% Na$_2$O and 30% SiO$_2$, although, as indicated above, any other generally suitable material is applicable. In each experiment the sodium stannate solution and the sodium silicate solution were mixed and heated in an autoclave to the temperature listed and held at such temperature under the time and pressure conditions shown. As a result of such treatment, both silica and stannic oxide were progressively formed and precipitated in the solution, being separated therefrom at the conclusion of each experiment and leaving a mother liquor remaining which contained free caustic alkali. A typical analysis of a mother liquor is as follows:

| Tin, g./l. | Silica, g./l. | Sodium Hydroxide | |
|---|---|---|---|
| | | Total, g./l. | Free, g./l. |
| 34.4 | 7.0 | 83.6 | 44.4 |

The column in Table 1 entitled "Tin Recovery, %" represents the amount of tin recovered in the tin oxide-silica composition based on the total amount of tin in the sodium stannate solution. The column headed "Stannic oxide content, %" gives the tin oxide content in each composition, the balance of the composition being silica plus a small amount of alkali as Na$_2$O and

TABLE 1

| Example No. | Sodium Stannate | | Sodium Silicate Amount cc. | Temp. °C. | Gauge Press. p.s.i. | Time hrs. | Tin Recovery Percent | Precipitated Composition | | |
|---|---|---|---|---|---|---|---|---|---|---|
| | Identity | Amount liters | | | | | | Stannic Oxide Content Percent | Comparison with Commercial Tin Oxide in Sanitary Ware Glazes | |
| | | | | | | | | | Pound for Pound Basis | Tin Oxide Basis |
| 1 | A | 2 | 50 | 265 | 730 | 1 | 89 | 86.3 | Matches Z | Matches Z. |
| 2 | A | 2 | 50 | 240 | 475 | 1 | 77 | 83.3 | Fair match to Y. | Whiter than Y. |
| 3 | A | 2 | 50 | 225 | 350 | 1 | 58 | 79.5 | Matches Y | Whiter than X. |
| 4 | A | 2 | 25 | 240 | 475 | 2 | 71 | 92.2 | Fair Match to Z. | Whiter than Y. |
| 5 | A | 10 | 250 | 225 | 350 | 1 |  | 77.0 | Good Match to Y. | Whiter than X or Y. |
| 6 | A | 10 | 250 | 225 | 350 | 1 |  | 85.0 | Matches Y | Do. |
| 7 | B | 5 | 160 | 225 | 350 | ½ | 73 | 85.4 | Whiter than X or Y. | Do. |
| 8 | C | 5 | 180 | 240 | 475 | ½ | 69 | 88.4 | Equal to X or Y. |  |
| 9 | D | 2 | 150 | 265 | 730 | 1 | 57 | 89.9 | Fair Match to Z. |  |
| 10 | E | 2 | 75 | 300 | 1,200 | 1 | 82 | 82.4 |  | Fair Match to Z. |

NOTE: X produces a slightly whiter glaze than Y; and Y gives a whiter glaze than Z.

The identity of the sodium stannate solutions appearing in the second column of the above table is given in Table 2.

TABLE 2

*Analysis of sodium stannate solutions*

| Identity | Tin g./l. | Sodium Hydroxide | |
|---|---|---|---|
| | | Total, g./l. | Free, g./l. |
| A | 78 | 99 | 10 |
| B | 102 | 108 | 7 |
| C | 114 | 137 | 24 |
| D [1] | 250 | 208 | 6 |
| E [1] | 190 | 160 | 5 |

[1] Slurries.

water. A typical analysis of a composition after partial neutralization and calcination is as follows:

| | |
|---|---|
| Tin oxide | 88.4% by weight |
| Silica | 7.8 |
| Na$_2$O | balance |

Regarding the ratings of the tin oxide-silica compositions, which in Table 1 is represented by their comparison with the commercial opacifiers, those compositions which are listed as "whiter" than the commercial material are superior thereto. Ratings of "equal" or "matches" denote equivalency, while "good" or "fair" indicates satisfactory performance.

In preparing the compositions from sodium stannate solutions it is an advantage to maintain the free alkali (NaOH), in the overall solution to be autoclave, at low concentrations, as otherwise the yield of tin oxide precipitated from the solution may be affected, as indicated in the following table:

TABLE 3

| Example No. | Concentration of— | | Tin Precipitated, g./l. of tin |
|---|---|---|---|
| | Sodium Stannate, g./l. of tin | Free NaOH g./l. | |
| 11 | 100 | 11 | 65 |
| 12 | 98 | 19 | 30 |
| 13 | 96 | 28 | 22 |
| 14 | 94 | 37 | 18 |

As above described, the tin oxide-silica compositions of the invention may be produced by heating under pressure a mixture of solid tin hydrate preferably in the form of a wet filter cake, and sodium silicate solution. The following examples illustrate this alternate method:

EXAMPLE 15

To 10 liters of a sodium stannate solution containing approximately 110 g./l. of tin was added enough sodium bicarbonate solution at 80° C. to produce complete precipitation of the tin as tin hydrate. After repeated washings by decantation, 740 cc. of sodium silicate of sp. gr. 1.4 were added to the precipitate, the total volume made up to 4 liters with the addition of water, and the resulting slurry heated to 230° C. in an autoclave for a period of ½ hour. After removal from the autoclave, the solid product was filtered, washed, acid-treated to a pH of 4.0, washed again, and dried at 110° C. It weighed 176 g. and had the following analysis:

| | Per cent |
|---|---|
| $SnO_2$ | 74.71 |
| $SiO_2$ | 15.05 |
| $Na_2O$ | 1.61 |
| Loss on ignition | 7.82 |
| Total | 99.19 |

When this product was substituted for commercial stannic oxide containing 99+% $SnO_2$ on a pound for pound basis in a Cone 11 Sanitary Ware glaze, the resulting product so closely approximated the commercial glaze that the naked eye could detect no difference.

EXAMPLE 16

To 1056 g. of wet tin hydrate, prepared as in Example 15, there was added 1 liter of sodium silicate solution and the total volume then made up to 4 liters by addition of water. This slurry was heated at 225° C. under 350 p. s. i. gauge for 1 hour, and the resulting solid composition was then filtered, washed, dried, and calcined at 700° C. It had the following analysis:

| | Per cent |
|---|---|
| $SnO_2$ | 60.3 |
| $SiO_2$ | 30.2 |
| $Na_2O$ | 9.9 |
| Total | 100.4 |

When this product was substituted for a commercial tin oxide in a ceramic glaze on a basis of tin oxide content, it gave a more opaque glaze, i. e., reflected more light than one containing the commercial oxide.

Other tests reveal that the present compositions compare favorably as opacifiers with commercial grades. In the following table are listed reflectance data for (1) a glaze containing the composition of Example 3; (2) a glaze containing the composition of Example 15; (3) a glaze employing the commercial opacifier X (99+% $SnO_2$); and (4) a glaze employing the commercial opacifier Y (99+% $SnO_2$). In all cases equal weights of the opacifiers were used without regard to their respective tin contents. Also, the glaze compositions were uniform beyond the selection of the opacifier.

TABLE 4

| No. | Opacifier Present in Glaze | Reflectance, Per Cent | | |
|---|---|---|---|---|
| | | With Blue Filter | With Green Filter | With Amber Filter |
| 17 | Example 3 | 65.7 | 72.8 | 73.1 |
| 18 | Example 15 | 63.1 | 69.0 | 71.1 |
| 19 | X | 64.2 | 69.8 | 70.3 |
| 20 | Y | 64.0 | 69.4 | 71.1 |

The above data were obtained with a Hunter Reflectometer, which, as is known, measures the per cent of light reflected from a surface. The use of filters tends to eliminate deviations resulting from the presence of color in the sample. As shown, the glaze of No. 17 is more opaque than either of the glazes containing the commercial opacifier, while the glaze of No. 18 compares quite favorably with the latter.

Alkali is generally present in the tin oxide-silica compositions and may run as high as 10% by weight (dry basis), calculated as $Na_2O$. It does not interfere with the opacifying power of the compositions, and, therefore, may be left therein. If desired, it can be reduced to 1% or eliminated, by treatment with acid. Reduction of the alkali to 1% or less, and preferably its complete elimination, is necessary when the compositions are used to prepare ceramic stains.

Water may also be present in the compositions, varying from about 0 to about 10% after drying at 110° C. The overall analysis, therefore, may be as follows (weight basis): tin oxide 60–90%, silica 5–30%, alkali as $Na_2O$ 0–10%, and water 0–10%. If the alkali is removed and/or if calcining at 700–1100° C. is carried out to remove the water, the remaining ingredients will be proportionately increased. A preferred composition is one containing about 75% by weight of stannic oxide, the balance of which may essentially comprise silica, or which may also contain alkali and/or water.

The tin oxide-silica compositions must be distinguished from purely mechanical mixtures formed by merely mixing dry powdered silica and stannic oxide. The latter mixtures do not show the opacifying properties of the compositions. The exact form in which the tin oxide and silica are present in the compositions is not known, but it is felt that they may be united in some way, either physically or chemically, as a result of which the compositions are distinguishable over mere mechanical mixtures. The compositions are also distinguishable over commercial grades of tin oxide in respect to color, the former having a whiter color than even 100% pure tin oxide.

In the light of the foregoing description, the following is claimed:

1. A method for obtaining silica-tin oxide opacifying compositions which comprises heating an aqueous solution containing sodium stannate and sodium silicate at a temperature in the range of about 150° C. to the critical temperature of water and at a pressure sufficient to maintain a liquid phase throughout said temperature range, whereby a composition comprising stannic oxide and silica is precipitated, continuing the heating until no further amount of precipitate is formed, and thereafter separating and recovering said precipitate from the remaining solution.

2. A method for obtaining silica-tin oxide compositions which comprises heating an aqueous solution containing sodium stannate and sodium silicate at a temperature in the range of about 150° C. to the critical temperature of water and at a pressure sufficient to maintain a liquid phase throughout said temperature range, whereby a composition comprising stannic oxide and silica is precipitated and caustic alkali is produced, and thereafter separating and recovering said precipitate from the remaining solution, said solution containing said caustic alkali.

3. A method for obtaining silica-tin oxide compositions which comprises heating an aqueous solution containing sodium stannate and sodium silicate at a temperature in the range of about 150° C. to the critical temperature of water and at a pressure sufficient to maintain a liquid phase throughout said temperature range, whereby a composition comprising stannic oxide and silica is formed.

4. A method for obtaining silica-tin oxide compositions which comprises heating an aqueous solution containing sodium stannate and sodium silicate at a temperature in the range of about 200 to 240° C. and at a pressure sufficient to maintain a liquid phase throughout said temperature range, whereby a composition comprising stannic oxide and silica is formed.

5. A method for obtaining silica-tin oxide compositions which comprises heating an aqueous solution of sodium silicate with a tin compound selected from the class consisting of sodium stannate and tin hydrate at a temperature in the range of about 150° C. to the critical temperature of water and at a pressure sufficient to maintain a liquid phase throughout said temperature range, whereby a composition comprising stannic oxide and silica is formed, continuing the heating until no further amount of solid material is formed, and thereafter separating and recovering said composition from the remaining solution.

6. A method for obtaining silica-tin oxide compositions which comprises heating an aqueous solution of sodium silicate with a tin compound selected from the class consisting of sodium stannate and tin hydrate at a temperature in the range of about 150° C. to the critical temperature of water and at a pressure sufficient to maintain a liquid phase throughout said temperature range, whereby a composition comprising stannic oxide and silica is formed.

7. A method for obtaining silica-tin oxide compositions which comprises heating an aqueous solution of sodium silicate with a tin compound selected from the class consisting of sodium stannate and tin hydrate at a temperature in the range of about 200 to 240° C. and at a pressure sufficient to maintain a liquid phase throughout said temperature range, whereby a composition comprising stannic oxide and silica is formed.

8. A precipitated silica-tin oxide composition comprising about 5 to about 30% by weight of silica and about 60 to about 90% by weight of stannic oxide, said composition having been formed by heating an aqueous solution of sodium silicate together with a tin compound selected from the class consisting of sodium stannate and tin hydrate at a temperature in the range of about 150° C. to the critical temperature of water and at a pressure sufficient to maintain a liquid phase throughout the temperature range.

9. A method for obtaining silica-tin oxide opacifying compositions containing about 5 to about 30% by weight of silica and about 60 to about 90% by weight of stannic oxide, which comprises heating an aqueous solution containing sodium stannate and sodium silicate at a temperature in the range of about 150° C. to the critical temperature of water and at a pressure sufficient to maintain a liquid phase throughout said temperature range, the concentrations of sodium stannate and sodium silicate in said solution being sufficient to produce said compositions, whereby a composition comprising stannic oxide and silica in the above stated proportions is formed.

10. A method for obtaining silica-tin oxide opacifying compositions containing about 5 to about 30% by weight of silica and about 60 to about 90% by weight of stannic oxide, which comprises heating an aqueous solution containing sodium stannate and sodium silicate at a temperature in the range of about 200 to 240° C. and at a pressure sufficient to maintain a liquid phase throughout said temperature range, the concentrations of sodium stannate and sodium silicate in said solution being sufficient to produce said compositions, whereby a composition comprising stannic oxide and silica in the above stated proportions is formed.

11. A method for obtaining silica-tin oxide opacifying compositions containing about 5 to about 30% by weight of silica and about 60 to about 90% by weight of stannic oxide, which comprises heating an aqueous solution of sodium silicate with a tin compound selected from the class consisting of sodium stannate and tin hydrate at a temperature in the range of about 150° C. to the critical temperature of water and at a pressure sufficient to maintain a liquid phase throughout said temperature range, the concentrations of sodium silicate and said tin compound being sufficient to produce said compositions, whereby a composition comprising stannic oxide and silica in the above stated proportions is formed.

HARTMUT W. RICHTER.

REFERENCES CITED

The following references are of record in the file of this patent:

UNITED STATES PATENTS

| Number | Name | Date |
| --- | --- | --- |
| 1,492,578 | Perino | May 6, 1924 |
| 2,395,524 | Weiser | Feb. 26, 1946 |